S. SPARROW.
ALTERNATING CURRENT MOTOR.
APPLICATION FILED MAY 13, 1911.
1,097,823.
Patented May 26, 1914.
2 SHEETS—SHEET 1.
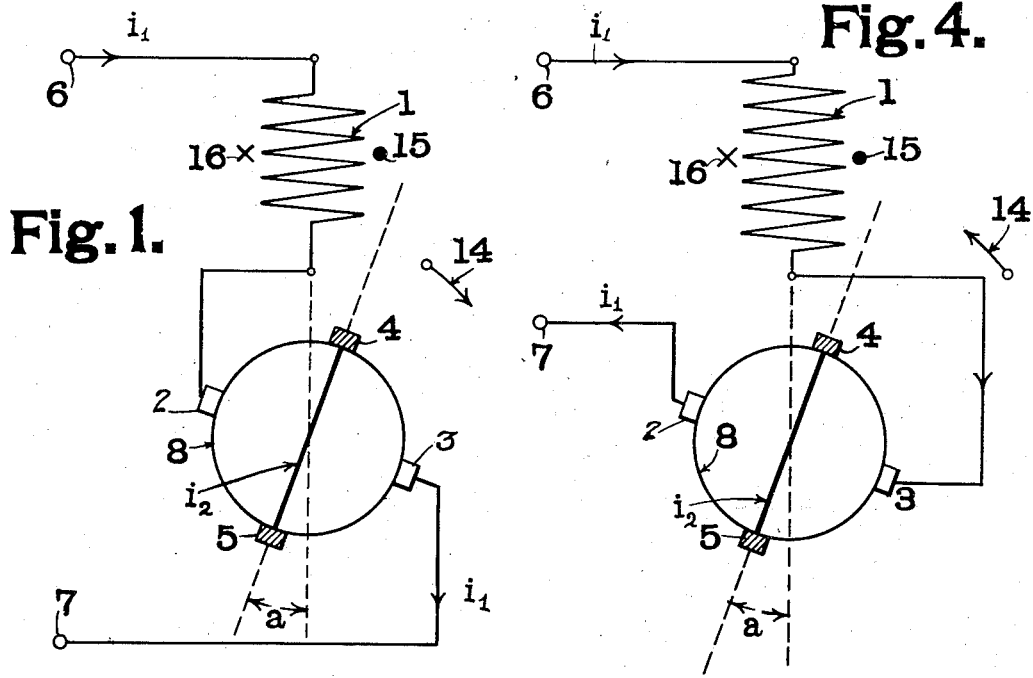
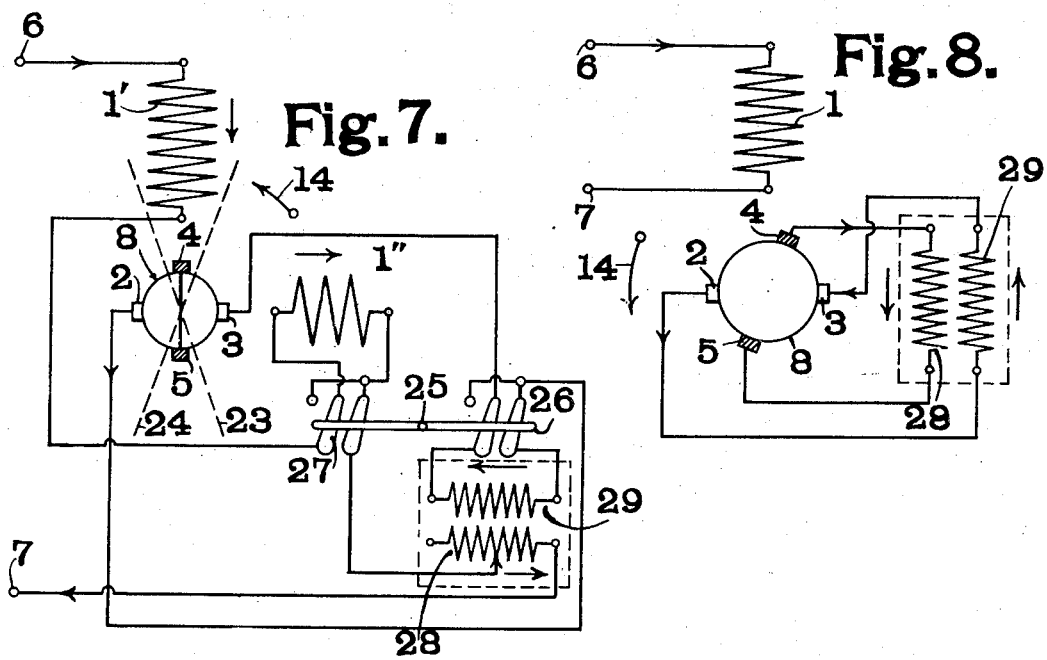
WITNESSES:
L. L. Mead
W. H. Alexander
INVENTOR
Simon Sparrow
BY
E. E. Huffman
ATTORNEY

S. SPARROW.
ALTERNATING CURRENT MOTOR.
APPLICATION FILED MAY 13, 1911.

1,097,823.

Patented May 26, 1914.
2 SHEETS—SHEET 2.

WITNESSES:
L. L. Mead
W. H. Alexander.

INVENTOR
Simon Sparrow
BY
E. E. Huffman
ATTORNEY

UNITED STATES PATENT OFFICE.

SIMON SPARROW, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

ALTERNATING-CURRENT MOTOR.

1,097,823.  Specification of Letters Patent.  Patented May 26, 1914.

Application filed May 13, 1911. Serial No. 626,962.

*To all whom it may concern:*

Be it known that I, SIMON SPARROW, a citizen of the United States, residing at the city of St. Louis, State of Missouri, have invented a certain new and useful Alternating-Current Motor, of which the following is such a full, clear, and exact description as will enable any one skilled in the art to which it appertains to make and use the same, reference being had to the accompanying drawings, forming part of this specification.

My invention relates to alternate current motors of the commutator type in which current approximately proportional to the stator current is caused to flow along two axes of the rotor. Motors of this kind as heretofore constructed have always had a true series characteristic. It is known that such machines develop a powerful starting torque which may increase during the first few revolutions but which on the whole decreases rapidly, with increasing speed. Such machines are unsuitable for accelerating heavy masses, tend to race at no load and when designed for a sufficient torque at normal speed, they usually develop an excessive torque at starting taking a correspondingly excessive current.

The main object of my invention is to cause motors of the type described to automatically assume with increasing speed a characteristic closely resembling that of a shunt motor.

My invention will be better understood by reference to the following description taken in conjunction with the accompanying diagrammatic drawings in which—

Figure 2:
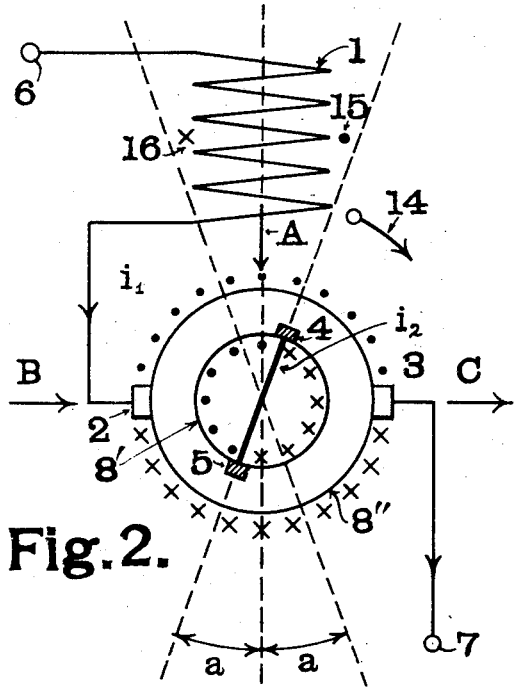
Figure 3:
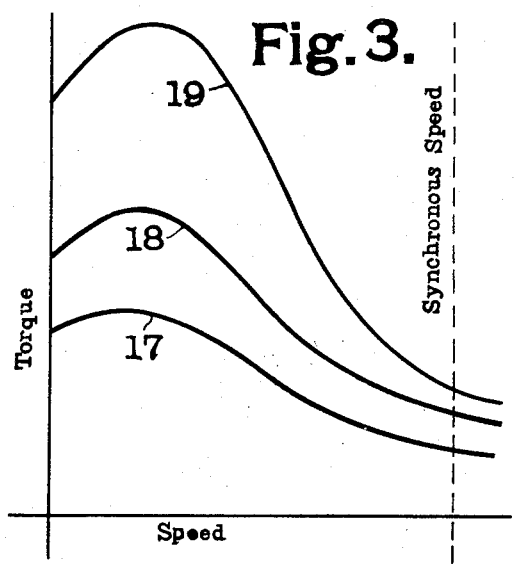

Figure 1 shows the connections of a known motor with series characteristic; Fig. 2 indicates the directions of the currents and fluxes and shows a somewhat different angular displacement of the brushes; Fig. 3 represents the shape of the speed torque curves which can be obtained with the motor connected as shown in Fig. 1 or 2; Fig. 4 shows my improved motor, Fig. 5 the direction of the currents and fluxes therein and Fig. 6 the shape of the speed torque curves which can be secured by said motor; Figs. 7 and 8 disclose modifications of the new motor shown in Fig. 4.

Referring to the known motor shown in Fig. 1 the stator carries an inducing winding 1, the rotor a commuted winding 8 with short-circuited brushes 4, 5 and other brushes 2, 3 displaced by about 90 electrical degrees from the first and connected in series with the stator winding I. The usual procedure in connecting up such a motor is to disconnect the brushes 2, 3 to which I will refer as the exciting brushes, leaving the stator winding 1 connected to the terminals 6, 7, and to displace the brushes 4, 5, which I will call the main or working brushes, in the one or the other direction according to the desired direction of rotation. The magnitude of this displacement generally amounts to about 20 electrical degrees. Having noted the direction of rotation thus secured the main brushes 4, 5, are temporarily disconnected from each other, the direction of the current through the stator winding 1 is kept the same and the exciting brushes are connected in series with the stator winding in such a manner as to produce rotation in the same direction as before.

While Fig. 1 shows the exciting brushes displaced from the working brushes by 90 electrical degrees and resting on the same commuted winding 8, yet it is well understood by those skilled in the art that there can be a separate commuted winding for each set of brushes and that the latter need not be displaced by just 90 electrical degrees. In order to simplify the following explanation of the operation of the known motor, I will first explain the operation of the form of that motor shown in Fig. 2. This machine is provided with two commuted winding 8' and 8'' and exciting brushes displaced by 90 electrical degrees from the axis of the stator winding 1. There exists along the axis of the stator winding a flux A of mutual induction linking with 1 and with the commuted winding 8' which is short-circuited by the working brushes 4, 5. This flux is due to the difference between the primary or stator ampere turns, the direction of which is indicated by the cross 16 and the dot 15, and that part of the secondary or rotor ampere turns due to $i_2$ which lie within the angles 90—$a$ and magnetize in a vertical direction. The remaining ampere turns due to $i_2$ are located within the angles $a$ and magnetize in a horizontal direction producing the flux B. The direction of the secondary current $i_2$ in 8' is indicated by crosses and dots placed within the circle representing the commuted winding 8'.

Since the exciting brushes 2, 3, are connected in series with the stator or inducing winding the current flowing through 8″ will be the same as that flowing through 1. This current $i_1$ in the winding 8″ will magnetize in a horizontal direction producing the flux C of same direction and of practically same phase as the flux B. The rotor ampere turns due to $i_1$ simply assist those rotor ampere turns due to $i_2$ which are responsible for the torque producing flux B. All the torques in this motor are positive or in a clockwise direction. Thus:

$$T_1 = A.i_2.a.n.\sin b$$
$$T_2 = A.i_1.90.n\sin b$$

and finally the main torque $$T_3 = (B+C)i_2.(90-a).n.$$

where $n$ stands for the rotor turns per degree circumference and $b$ is the phase angle between $i_1$ and the line E. M. F. Cos. $b$ is therefore the power factor of the machine. The better the power factor the smaller $T_1$ and $T_2$, and for unity power factor these two torques become practically *nil*. The E. M. F.'s $e'A$ and $e''A$ generated by rotation of 8′ and 8″ respectively in A improve the power factor of the machine. The E. M. F.'s $eB$ and $eC$ generated by rotation of 8′ in B and C and appearing at the brushes 4, 5, are the back E. M. F.'s of the motor and cause $i_2$ and therefore $i_1$ to diminish rapidly with increasing speed. Because both $i_1$ and $i_2$ are responsible for the torque producing fluxes B and C while $i_2$ is responsible for the main torque of the motor, it is clear that this motor will have a series characteristic for both working current $i_2$ and motor field B+C vary simultaneously and very nearly in the same proportion. Fig. 3 shows a number of speed torque curves 19, 18, 17, which can be obtained with the arrangement shown in Fig. 1 or 2. Their absolute values can be increased or decreased by adjusting $a$ or the rotor ampere turns due to $i_1$ but they always retain their drooping shape.

Now according to this invention I displace the working brushes 4, 5, from the stator winding 1 so as to obtain a rotation in one direction and then temporarily opening the circuit of the brushes 4, 5, I connect the exciting brushes 2, 3, in series with 1 in such a way as to produce rotation in the opposite direction and I prefer to select the proportions of my motor in such a way that it will revolve in the direction in which the exciting brushes tend to drive it even when the working brushes are short-circuited. The connections necessary to this end are shown in Fig. 4 the curved arrow 14 indicating the direction of rotation.

Figure 5:
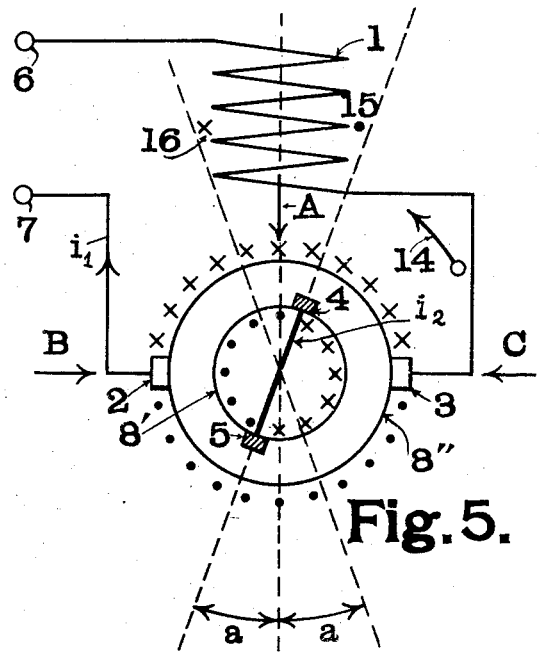
Figure 6:
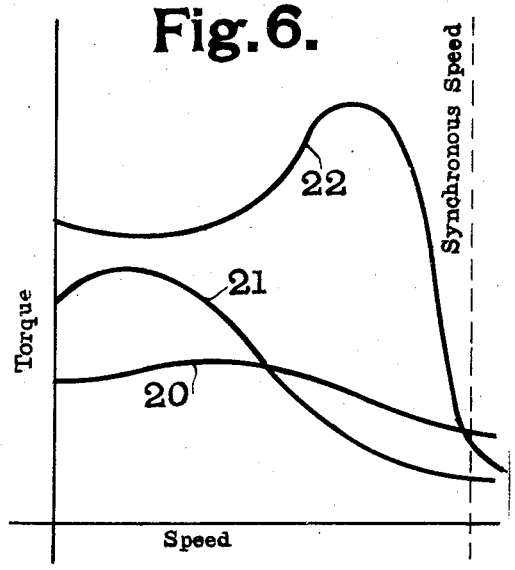

In order to clearly point out the mode of operation of my improved motor I make use of the motor shown in Fig. 5 and which only differs from that shown in Fig. 4 in that its rotor carries two commuted windings and in that the exciting brushes are displaced by 90 electrical degrees from the winding 1 instead of the brush line 4, 5. The one commuted rotor winding 8′ of this figure is short-circuited over the brushes 4, 5, placed at an angle $a$ to the axis of the stator winding 1 and the other commuted winding 8″ is connected in series with 1 but the current $i_1$ is sent through it from right to left instead of from left to right, as is the case in the known motor shown in Fig. 2. Comparing Figs. 2 and 5, the transformer flux A due to 1 in Fig. 5 is the same as in Fig. 2 but the flux C produced by the rotor ampere turns due to $i_1$ now opposes the flux B produced by the horizontal rotor ampere turns due to $i_2$. The three torques are now approximately as follows:

$T_1 = A.i_2.a.n.\sin b$ (clockwise)
$T_2 = A.i_1.90.n.\sin b$ (counterclock-wise)
$T_3 = (C-B)(90-a)i_2.n.$ For C=B the torque $T_3$ is, of course, zero; when C is larger than B, it is counter-clockwise; when B is larger than C it is clockwise. Assuming that the ampere turns in 8″ due to $i_1$ are so chosen as to equal the magnetizing effect of that part of the ampere turns due to $i_2$ which is responsible for B, then the resultant flux along the horizontal axis becomes zero and the direction of rotation is determined by the torque $T_2$ and is counterclockwise. The E. M. F. $e'A$ due to counterclockwise rotation of 8′ in A and appearing at the brushes 4, 5, increases the total E. M. F. in the rotor short-circuit and this tends to increase $i_2$ but also makes the power factor of the motor worse by causing $i_2$ to lag more behind the rotor E. M. F. induced in 8′ by A. The E. M. F. $e''A$ due to counter-clockwise rotation of 8″ in A and appearing at the brushes 2, 3, still tends to improve the power factor of the motor because although its direction is opposed to that which it had in Fig. 2 on account of the reversed direction of rotation, yet it is also introduced into the primary circuit in reverse direction thus retaining its original direction relatively to the primary circuit. The power factor increases with speed simply because the apparent impedance of the rotor along the axes 2, 3, diminishes. Every such reduction of the apparent impedance decreases the volts as measured across the brushes 2, 3, and consequently increases the volts as measured across the stator winding 1. The higher the voltage across 1 the greater A, the greater $i_2$ and the greater $i_1$ for there is no back E. M. F. generated in the short-circuited rotor winding. The torque of the motor will therefore increase at first as the speed increases owing to the increase of A, of $i_1$ and of $i_2$, but will soon begin to decrease, although the speed continues to increase, because of the improved power factor bringing about a rapid reduction of sin. $b$. The curve 20 of Fig. 6 indicates the nature of the speed torque curve obtained when B=C. If B is made greater than C then the direction of rotation soon reverses because both $T_1$ and $T_3$ are now clockwise torques and soon overpower $T_2$. The machine assumes the characteristic 21 of Fig. 6 which is seen to be very similar to those shown in Fig. 3. The motor now operates with a bad power factor.

I prefer to make the flux C greater than the flux B thus making $T_3$ of a counter-clockwise direction and securing counter-clockwise rotation as indicated in Figs. 4 and 5. In this combination the power factor of the motor rises fast at first because of the E. M. F. generated in 8" by rotation in A and because of the increased losses due to the rapidly rising currents but this rate of rising diminishes as unity power factor is approached. This rising power factor causes a rapid increase of A which tends to induce a greater $i_2$ and consequently also tends to increase $i_1$. The increase of $i_2$ is further accelerated by the E. M. F. generated in 8' by rotation in A. The flux C=B which is responsible for the back E. M. F. increases proportionately to $(i_1-i_2)$ only as long as the iron densities are low. It is therefore apparent that both $i_2$ and $i_1$ will rise at first, decreasing only when the rate of increase of A has become small. This causes $T_3$ to increase very rapidly until A has nearly reached its normal value when the back E. M. F. takes the upper hand. Both $T_1$ and $T_2$ tend to increase with $i_2$ and $i_1$ and to decrease with decreasing sin. $b$. The latter diminishes slowly when $b$ is near 90 but more rapidly as $b$ approaches zero. The torque $(T_2-T_1)$ will therefore first increase helping $T_3$ then decrease and finally reverse its sign thus opposing $T_3$. This reversal of sign takes place about the time when the power factor passes through unity and becomes leading. At that time $T_3$ is already decreasing because of the overpowering effect of the back E. M. F. and its decrease is of course accelerated by the reversal of the torque $(T_2-T_1)$. The shape of the resultant speed torque curve is shown by curve 22 of Fig. 6. Displacing the exciting brushes by 90 electrical degrees from the working brushes tends to decrease $i_2$ because some of the rotor ampere turns due to $i_1$ then also do duty as secondary ampere turns to those of the stator winding 1, but the shape of the speed torque curve is not materially affected thereby. The shape of the speed torque curve to be obtained with my new motor therefore mainly depends on the rotor ampere turns produced by $i_1$ as compared to those produced by $i_2$ and on the angle by which these ampere turns are displaced from each other, their individual orientation with respect to the axis of 1 being somewhat as shown in Fig. 4 or 5. The angle $a$ will as a rule be chosen in the neighborhood of 20 electrical degrees and the exciting brushes will usually be displaced by 90 electrical degrees from the working brushes. The ratio of the rotor ampere turns due to $i_2$ and to $i_1$ can be adjusted for a chosen position of the working and exciting brushes by suitably selecting the ratio of rotor to stator turns or by interposing a series transformer of a suitable ratio between 1 and the rotor or in any like manner.

The motor shown in Fig. 7 possesses means whereby its direction of rotation can be reversed and also has a series transformer adapted to adjust the shape of its speed torque curve. The stator winding 1 is divided into two unequal parts 1' and 1" displaced by 90 electrical degrees and connected in series through the reversing switch 27. The stator windings are also connected in series with the primary 28 of an adjustable ratio series transformer the secondary 29 of which is connected to the exciting brushes 2, 3, through the reversing switch 26. Both reversing switches are actuated by the same lever 25. When the reversing switches are in the positions shown then the magnetization produced by 1' and 1" is directed along the dotted line 23 and the motor revolves in the counter-clockwise direction 14. When both reversing switches are placed in the other extreme position the resultant stator magnetization shifts to the line 24 and the motor starts in the opposite direction.

In Fig. 8 a series transformer is interposed between the two rotor circuits instead of between the stator and one of the rotor circuits as in Fig. 7. This change in the connections does not disturb the series relation between the stator winding 1 and the circuit of the exciting brushes 2, 3; it merely interposes two series transformers between 1 and the brushes 2, 3. The primary of the first of these series transformers is the stator winding 1, its secondary is the rotor circuit between the brushes 4, 5. This secondary feeds the primary 28 of the second transformer, the secondary of which is connected to the second rotor circuit comprising the exciting brushes 2, 3. The machine operates as before, provided the connections are as shown,—that is, such that the several torques developed by the motor are not all of the same direction.

Having fully described my invention, what I claim as new and desire to secure by Letters Patent of the United States is:

1. In an alternating current motor, the combination of an inducing member, an induced member provided with a commuted winding short-circuited to produce a torque in one direction, and means for supplying a current to the induced member to produce a greater torque in the opposite direction.

2. In an alternating current motor, the combination of an inducing member provided with a main inducing winding, and an induced member provided with a commuted winding short-circuited to produce a number of ampere turns at right angles to the main inducing winding and connected in series relation with the inducing winding in such manner as to produce in the same axis a greater number of oppositely directed ampere turns.

In testimony whereof, I have hereunto set my hand and affixed my seal in the presence of the two subscribing witnesses.

SIMON SPARROW. [L. S.]

Witnesses:
C. B. BENNETT,
M. L. FRANKLIN.